United States Patent [19]

Yoshida et al.

[11] Patent Number: 4,951,273
[45] Date of Patent: Aug. 21, 1990

[54] OPTICAL RECORDING AND REPRODUCING DEVICE WITH NORMALIZATION OF SERVO CONTROL SIGNAL USING SWITCHABLE AUTOMATIC GAIN CONTROL CIRCUITRY

[75] Inventors: Toshifumi Yoshida, Suita; Mitsuo Nabae, Nagaokakyo; Yasuo Nishinaka, Hirakata; Mitsuro Moriya, Neyagawa, all of Japan

[73] Assignee: Matsushita Electric Industrial Co., Ltd., Kadoma, Japan

[21] Appl. No.: 311,409

[22] Filed: Feb. 15, 1989

Related U.S. Application Data

[63] Continuation of Ser. No. 16,720, Dec. 10, 1986, abandoned.

[30] Foreign Application Priority Data

Apr. 10, 1985 [JP] Japan .................. 60-75616
Apr. 26, 1985 [JP] Japan .................. 60-90001
Apr. 26, 1985 [JP] Japan .................. 60-90011

[51] Int. Cl.[5] .............................................. G11B 7/09
[52] U.S. Cl. .................................. 369/44.11; 369/124; 369/44.21
[58] Field of Search ...................... 369/43–46, 369/124; 250/201 DF; 381/57, 68.4, 107; 307/493; 330/254, 278

[56] References Cited

U.S. PATENT DOCUMENTS

| | | | |
|---|---|---|---|
| 4,234,804 | 11/1980 | Bergstrom | 307/493 |
| 4,247,955 | 1/1981 | Weidemann | 381/57 X |
| 4,341,962 | 7/1982 | Buff | 307/493 X |
| 4,344,165 | 8/1982 | Akiyama | 369/44 |
| 4,377,792 | 3/1983 | Blackmer et al. | 307/493 X |
| 4,385,364 | 5/1983 | Main | 307/493 X |
| 4,388,540 | 6/1983 | Schreurs | 307/493 |
| 4,479,237 | 10/1984 | Sugasawa | 381/57 |
| 4,486,791 | 12/1984 | Wada et al. | 369/45 X |
| 4,553,257 | 11/1985 | Mori et al. | 381/57 |
| 4,558,459 | 12/1985 | Noso et al. | 381/57 X |
| 4,580,255 | 4/1986 | Inoue et al. | 369/44 |
| 4,580,287 | 4/1986 | Richards, Jr. | 330/254 X |
| 4,587,644 | 5/1986 | Fujiie | 369/44 |
| 4,611,317 | 9/1986 | Takenchi et al. | 369/44 X |
| 4,616,353 | 10/1986 | Kaneda et al. | 369/43 |
| 4,623,933 | 11/1986 | Sato et al. | 330/254 X |
| 4,626,930 | 12/1986 | Sugiyama | 369/44 X |
| 4,630,302 | 12/1986 | Kryter | 381/57 |
| 4,633,495 | 12/1986 | Schotz | 381/107 X |
| 4,646,029 | 2/1987 | Kamata et al. | 330/254 X |
| 4,661,942 | 4/1987 | Yoshimoto et al. | 369/44 |

FOREIGN PATENT DOCUMENTS

572731 10/1945 United Kingdom .
727596 4/1955 United Kingdom .
844561 8/1960 United Kingdom .

OTHER PUBLICATIONS

British Application letter from British Patent Agent Discussing Each of the References. dated 2/88.
ICL8013, Intersil Manual, pp. 5–218–5–224, 1979.
MC1495L, Motorola Manual, pp. 3–438–3–452, 1981.
MC1594L, Motorola Manual, pp. 3–424–3–437, 1981.

Primary Examiner—Steven L. Stephan
Assistant Examiner—W. R. Young
Attorney, Agent, or Firm—Cushman, Darby & Cushman

[57] ABSTRACT

The present invention discloses a control circuit. An AGC circuit has an input of an x input signal and a gain control amplifier has an input of a z input signal. A division operation of $\frac{z}{x}$ is made by controlling the gain of the gain control amplifier by a gain control voltage issued from the AGC circuit. A division output signal is obtained from an output terminal of the gain control amplifier, and is usable for compensating focus error, tracking error or the like in an optical recording and reproducing apparatus which makes recording and reproducing by a light of laser light or the like. Also included is a switching circuit that allows offset voltages to be reduced.

5 Claims, 11 Drawing Sheets

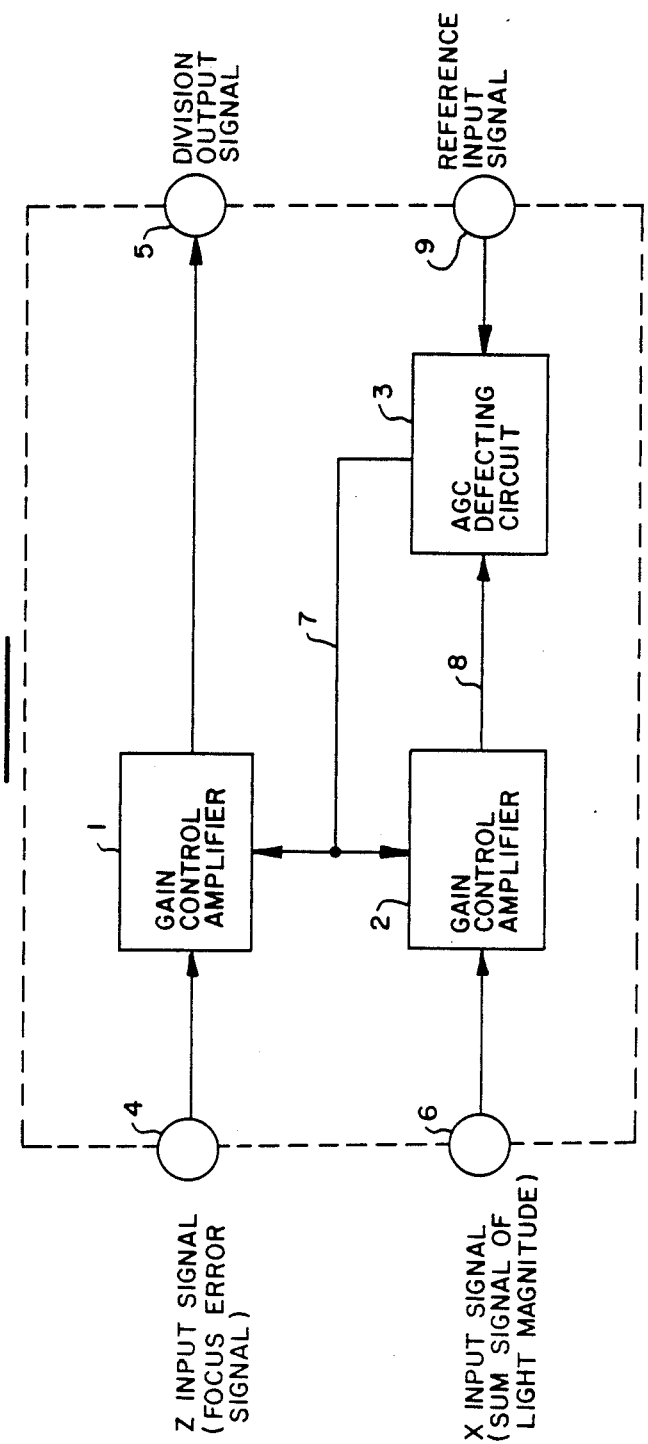

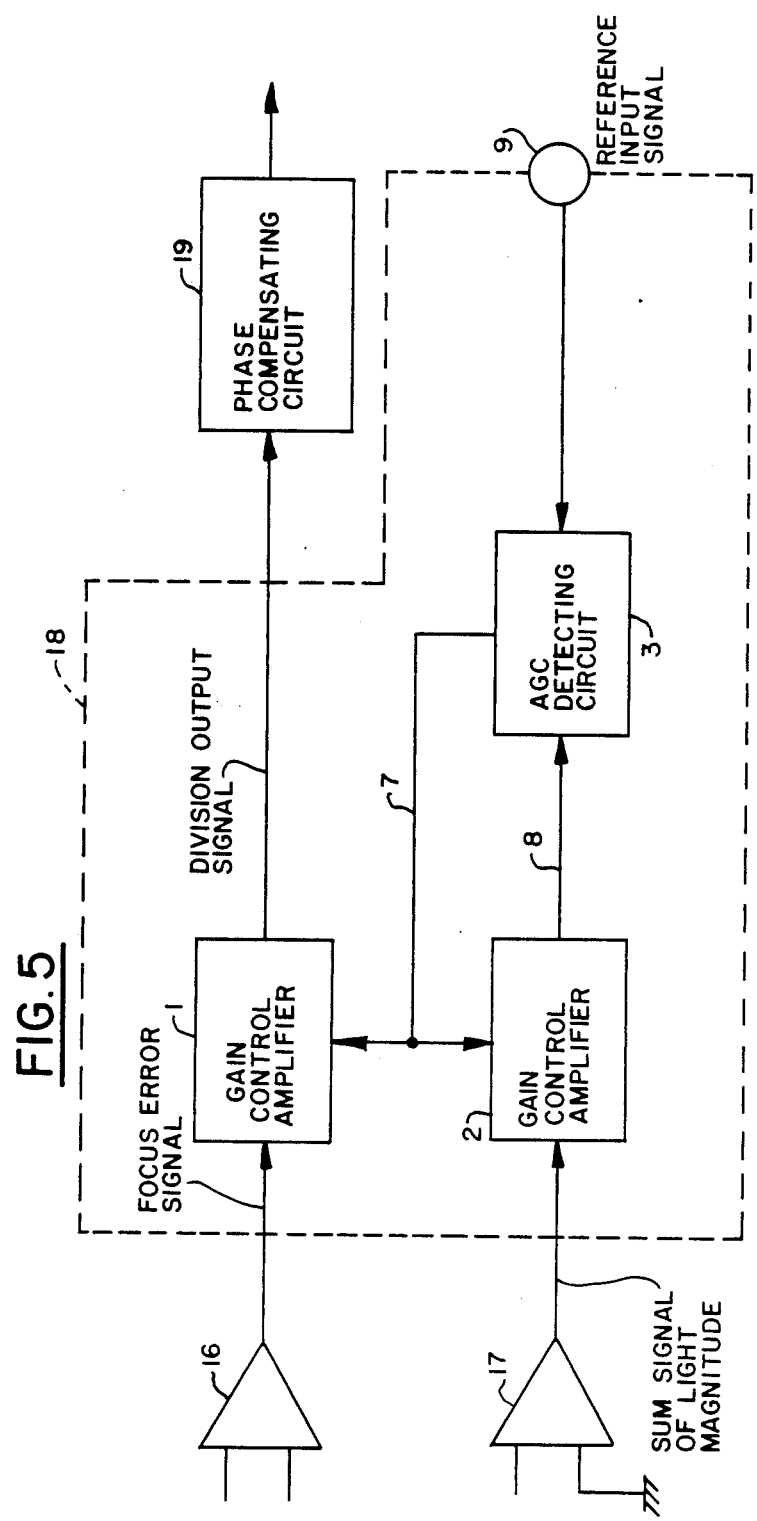

OPTICAL RECORDING AND REPRODUCING DEVICE WITH NORMALIZATION OF SERVO CONTROL SINGAL USING SWITCHABLE AUTOMATIC GAIN CONTROL CIRCUITRY

This is a continuation of application Ser. No. 07/016,720, filed Dec. 10, 1986, which was abandoned upon the filling hereof.

BACKGROUND OF THE INVENTION

1. The Field of the Art

The present invention relates to a control circuit which compensates focus error, tracking error or the like in an optical recording and reproducing apparatus.

2. Background of the Prior Art

The use of optical recording and reproducing apparatuses using semiconductor lasers has increased and an apparatus having both recording-reproducing functions as well as reproducing is now produced on a commercial scale. There are opto-magnetic methods, optical methods, or the like as recording-reproducing methods; a surface state of a disk is varied by raising laser light output in the recording process, and recorded information is read by a low laser light output in the reproducing process. In order to record and reproduce the information by the laser light, precise tracking of the laser light along a desired recording track are required. These respective requirements are realized by a servo system for focus control and tracking control, respectively.

Focus control generally will now be further described. As shown in FIG. 1, laser light beam is radiated from laser optical system 11 and is impinged onto a disc 13. Reflected light beam from the disc 13 reaches a PIN photodiode pair 15 through a beam splitter 12. Output signals of the PIN photodiode pair 15 are fed to operational amplifiers 16 and 17. A focus error which represents the focus error of the laser light on the disc 13 and a sum signal which represents the light magnitude of the laser light beam are obtained from the PIN photodiode pair 15 and the operational amplifiers 16 and 17. The focus error signal whose, reference level is 0 V generally, is used in a focus control system. Even though focus error signals have the same value V in the reproducing process and the recording process, they represent different focus error values depending on the state involved. That is to say, provided that the focus error is n $\mu$m for the error signal v in the reproducing process, the focus error is n/4 $\mu$m even if the error signal is the same v in the recording process, because the output value of the laser light beam of the laser optical system 11 is made four times as great in the recording process. Loop gain of the focus control loop is maintained constant by having a feedback system that obtains the amount of focus error precisely in the recording process and the reproducing process, by using a division circuit 18 to obtain a stable focus servo system.

The numeral 19 designates a phase compensating circuit, and it compensates the phase delay of a actuator 14 which drives the laser optical system 14 for focussing, whereby a loop gain point of the feedback loop that becomes a value of 1 is set to a stable frequency. Numeral 20 is a pull-in signal generator, which moves the laser optical system 11 in saw tooth wave manner by the actuator 14 and searches for an accurately focused position in order to pull-in the focus. A switching circuit 21 supplied to the drive circuit 22 a signal of the pull-in signal generator 20 until completion of pull-in of the focus, and after completion of pull-in of the focus, supplies a signal of the phase compensation circuit 19 for controlling operation of the focus control. The drive circuit 22 drives the actuator 14 in response to the signal from the switching circuit 21, and controls the laser optical system 11 through the actuator 14 to control focusing.

As mentioned above, the division circuit 18 is essential and important in the optical disk apparatus which records and reproduces datas on the optical disk 13 by using the feedback control loop system for focussing, and various division circuits have been proposed. An example of the conventional division circuit is shown in FIG. 2. The division circuit in FIG. 2 uses a multiplier 30 and an operational amplifier 31, and it is made by IC which is on sale. (Reference document: ICL8013 in a manual of Intersil, MC1495L, MC1594L in the manual of Motorola linear/interface devices).

Referring to FIG. 2, a sum signal of light magnitude is inputted through a terminal 33 to the multiplier 30. The focus error signal is inputted through an input terminal 34 and passes a resistor 32. The focus error signal and the output of the multiplier 30 are inputted to the operational amplifier 31. The output of the operational amplifier 31. The output of the operational amplifier 31 is fed back to the multiplier 30. The division output signal is outputted from the amplifier 31 through an output terminal 35.

Next, operation of the circuit as shown in FIG. 2 will be described as follows. The output of the multiplier 30 is formed as a current source and its output current ($I_O$) is $$I_O = K \cdot \text{(sum signal of light magnitude)} \cdot \text{(division output signal)}. \tag{1}$$

Since the output of the operational amplifier 31 is fed back to the multiplier 30 the multiplier 30 is controlled to equalize two inputs of the operational amplifier 31. One input of the operational amplifier 31 is grounded, and the both inputs become 0 V. Accordingly, provided that the resistance of the resistor 32 is R, $$\text{(Focus error signal)} = I_O R \tag{2}$$

The division output signal is obtained from the equations (1) and (2) as follows:

$$\begin{aligned}\text{Division output signal} &= \frac{I_O}{K \cdot \text{(sum signal of light magnitude)}} \\ &= \frac{1}{K \cdot R} \cdot \frac{\text{(Focus error signal)}}{\text{(sum signal of light magnitude)}} \end{aligned} \tag{3}$$

This shows that the focus error signal (z input signal) is divided by sum signal of light magnitude (x input signal).

In the division circuit of this system, however, to remove the offsets of three inputs, the x input signal (sum signal of light magnitude), z input signal (focus error signal) and division output signal, which are fed back to the multiplier 30, three variable resistors for offset adjustment are required. In order to improve precision of division, trimming of the resistor formed in an integrated circuit is required, and a special process to provide this on an integrated circuit is necessary. Therefore, for the conventional division circuit, although merchandized as an independent integrated circuit, it is not suitable for mounting on an integrated circuit for automatic control.

SUMMARY OF THE INVENTION

An object of the present invention is to provide a control circuit wherein the number of offset adjustment parts is small, high precision is easily obtained, and it can be manufactured in the same integrated circuit with other circuits.

Another object of the present invention is to provide a stable focus servo circuit using the control circuit and a feed back system for a tracking servo circuit or the like.

The control circuit in accordance with the present invention is characterized by providing an automatic gain control (hereinafter referred to as AGC) circuit in which a focus error signal is inputted to a gain control amplifier to which a light magnitude sum signal is inputted. The division operation is accomplished by control of the gain control amplifier by the gain control voltage of the AGC circuit, and the division output signal is obtained from the output terminal of the gain control amplifier.

The present invention also includes a automatic gain amplifier that possesses two different differential amplifiers, one used for reproducing and another for recording. Each amplifier has different gain and dynamic range characteristics. By switching to the appropriate differential amplifiers, a division signal that is appropriate for recording and reproducing modes is obtained.

BRIEF DESCRIPTION OF THE DRAWINGS

This invention will be described further, by way of example, with reference to the accompanying drawings, in which:

FIG. 3 is a block diagram of the division circuit used in a control circuit of an embodiment of the present invention;

FIG. 5 is a block diagram showing an application of the division circuit of FIG. 3;

DETAILED DESCRIPTION OF THE PREFERRED EMBODIMENT

Figure 1:
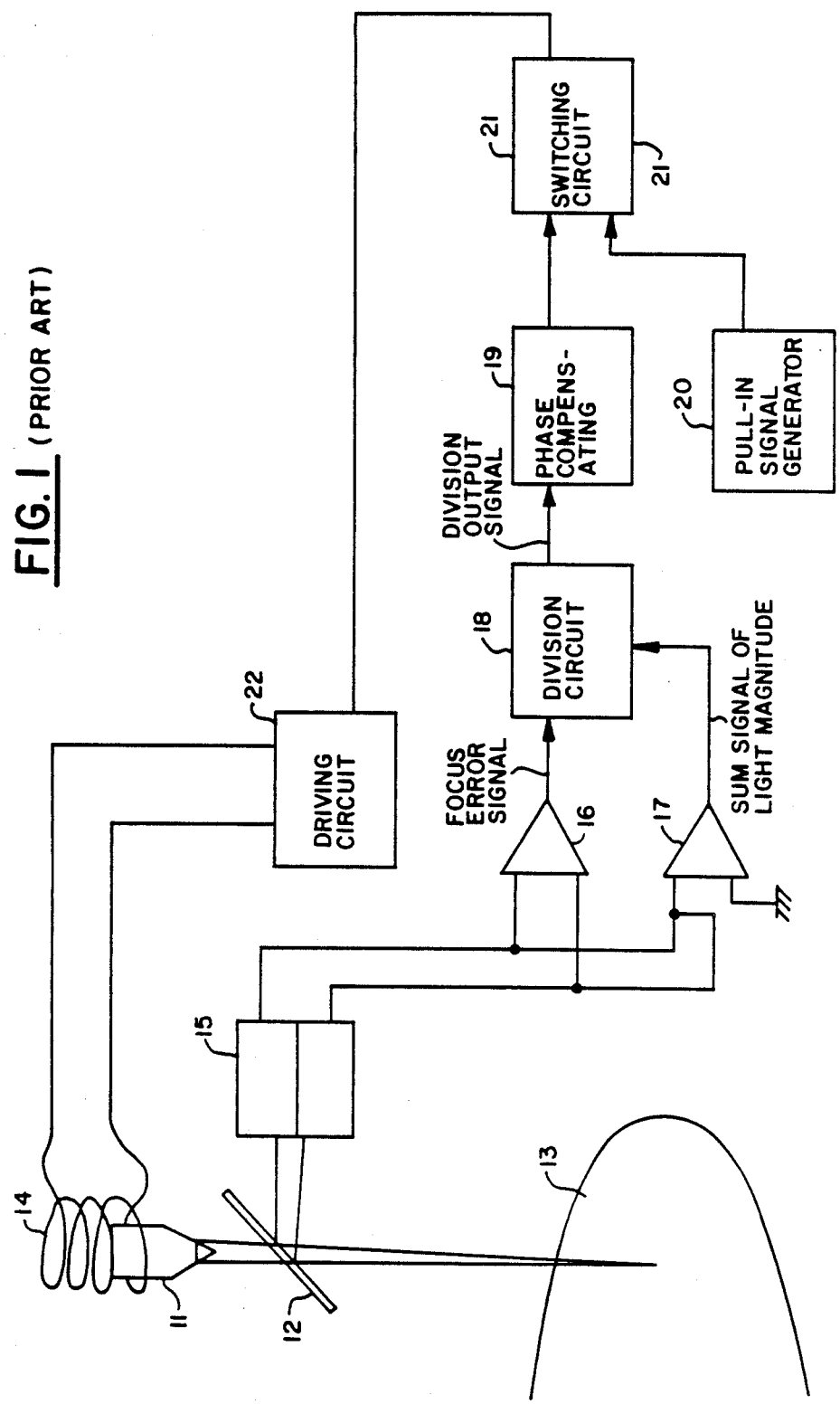
FIG. 1 is the block diagram of an optical recording and reproducing apparatus having a division circuit.
Figure 2:
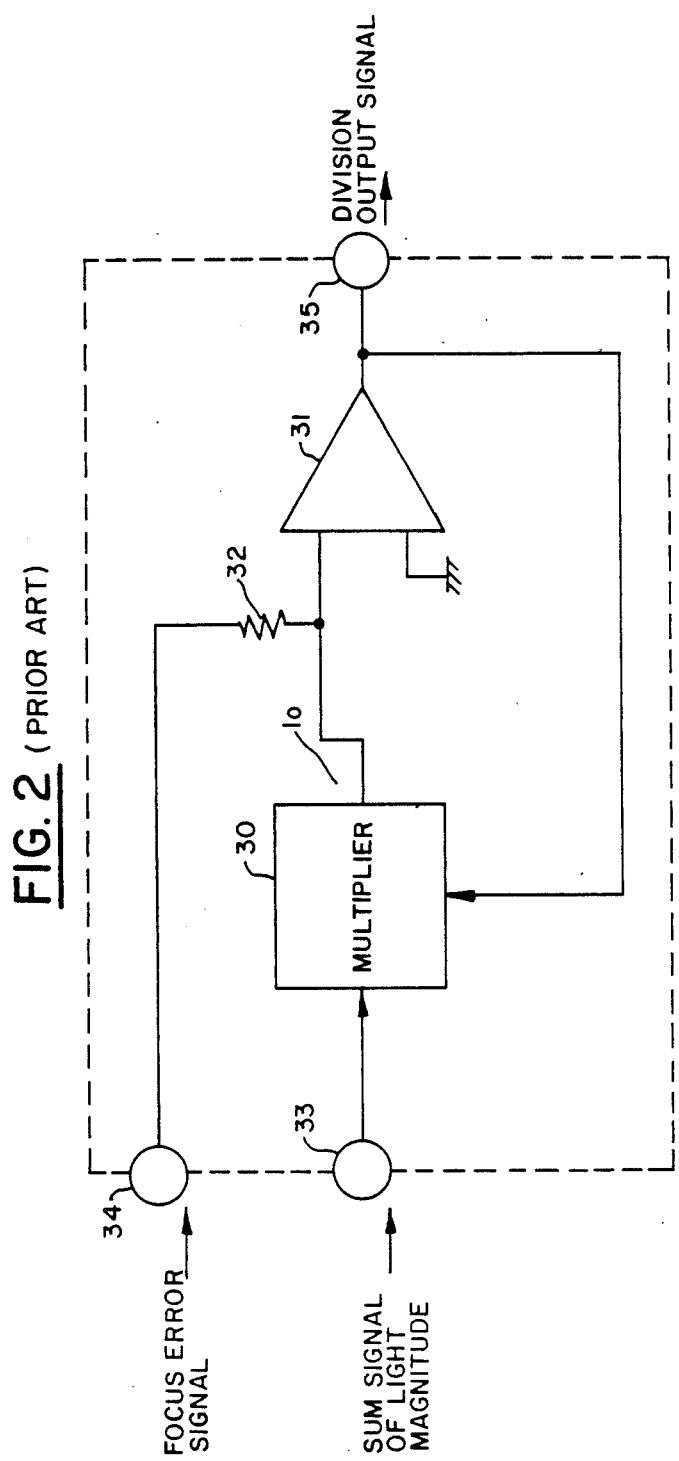
FIG. 2 is the block diagram showing a conventional division circuit.

Hereinafter, a division circuit which is used in an optical recording and reproducing apparatus of the preferred embodiment of the present invention is elucidated with reference to the figures.

The present embodiment is a division circuit used in a control circuit for correcting a focus error, a tracking error or the like of the optical recording and reproducing apparatus, and an example of the configuration in shown in FIG. 3.

In FIG. 3, numerals 1 and 2 designate gain control amplifiers, and numeral 3 designates an AGC detecting circuit. The AGC circuit is comprised of the gain control amplifier 2 and the AGC detecting circuit 3. A z input signal is inputted from an input terminal 4, and is applied to the gain control amplifier 1. An x input is inputted from an input terminal 6, and is applied to the gain control amplifier 2. The x input signal is amplified by the gain control amplifier 2 by a gain of G, and is output to a line 8 as the AGC output signal, and is applied to the AGC detecting circuit 3. The AGC detecting circuit 3 compares a level of the AGC output signal with a level of a reference input signal inputted from an input terminal 9, and controls a gain of the gain control amplifier 2 by a gain control signal issued from a line 7 to equalize the level of the AGC output signal and the reference input signal. The reference input signal is a DC signal of a predetermined voltage, and is fed by a DC power source.

When a value of the AGC output signal issued from a line 8 is defined as $V_8$, the following holds:

$$(x \text{ input signal}) \cdot G = V_8 \tag{4}$$

The gain control amplifier 1 is controlled by a gain control signal from the AGC detecting circuit 3 in a manner that the gain thereof is equalized to the gain of the gain control amplifier 2. Therefore, the following holds:

$$(z \text{ input signal}) \cdot G = (\text{division output signal}). \tag{5}$$

That is to say, $$\text{(division output signal)} = (z \text{ input signal}) \cdot G = \frac{(z \text{ input signal})}{(x \text{ input signal})} \tag{6}$$

holds, to make the division operation. The division output signal is issued from an output terminal 5.

For a specific application, the various signals described above can be further labeled as follows. If the x input signal is a light magnitude sum signal and the z input signal is a focus error signal, the following hold:

$$(\text{light magnitude sum signal}) \cdot G = V_8 \tag{7}$$

and, $$(\text{focus error signal}) \cdot G = (\text{division output signal}) \tag{8}$$

and therefore, $$\text{division output signal} = (\text{focus error signal}) \cdot G = \tag{9}$$

$$\frac{(\text{focus error signal})}{(\text{light magnitude of sum signal})}$$

In this configuration, the AGC circuit and the gain control amplifier can be formed as an IC circuit. Also, no special process is required for fabricating the IC. Furthermore, the offset adjustment does not require respective offset adjustment variable resistors for all the three input signals such as the x input signal, the z input signal and the input of a multiplier of the division output signal. Rather, as shown in FIG. 3, since the z input signal only influences offset of the division output signal, offset adjustment to only the z input signal is sufficient. Consequently, it has an advantage that the IC will require few offset adjustment parts.

Figure 4A:
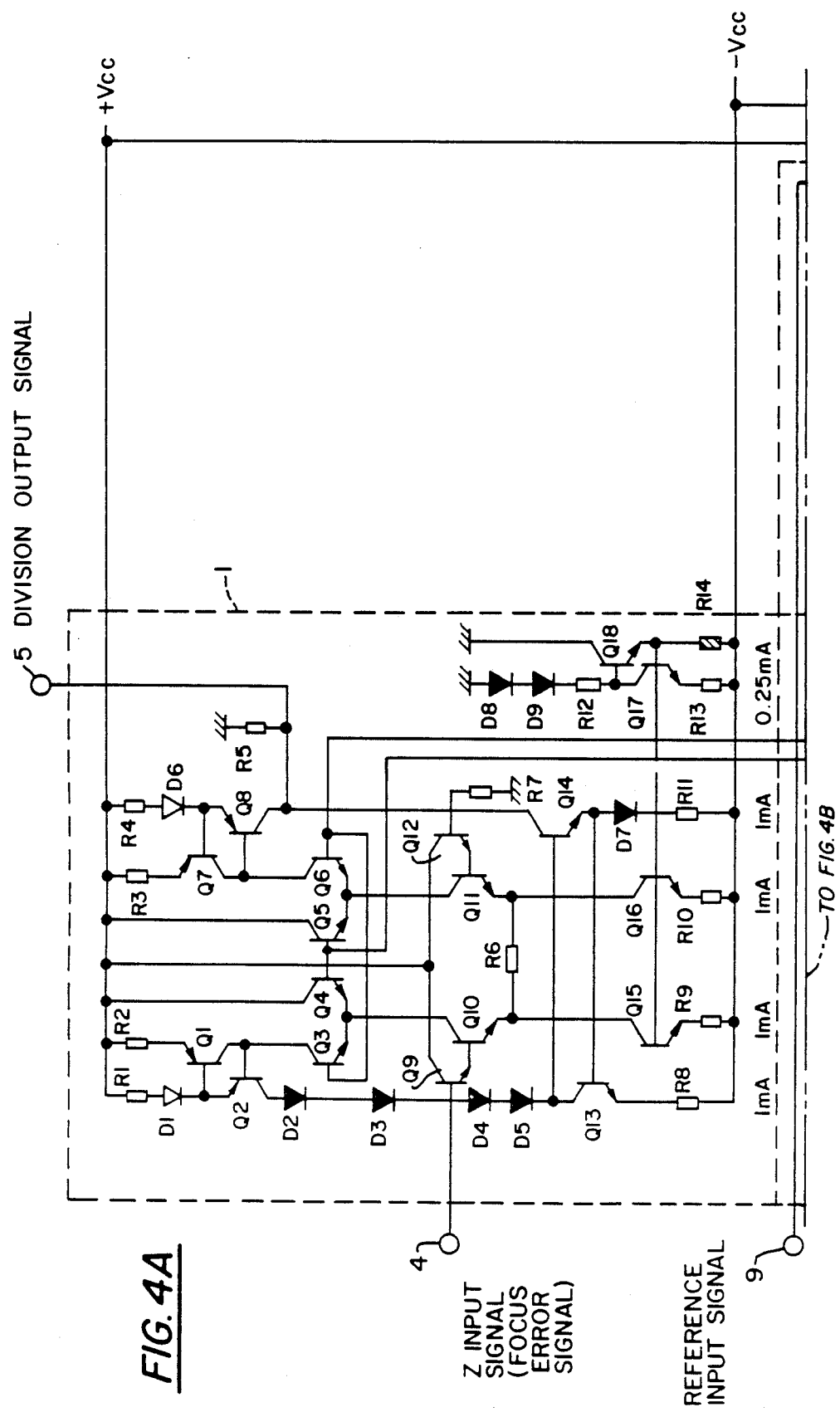
FIGS. 4(A, B) is circuit diagram of the embodiment of the division circuit shown in FIG. 3.
Figure 4B:
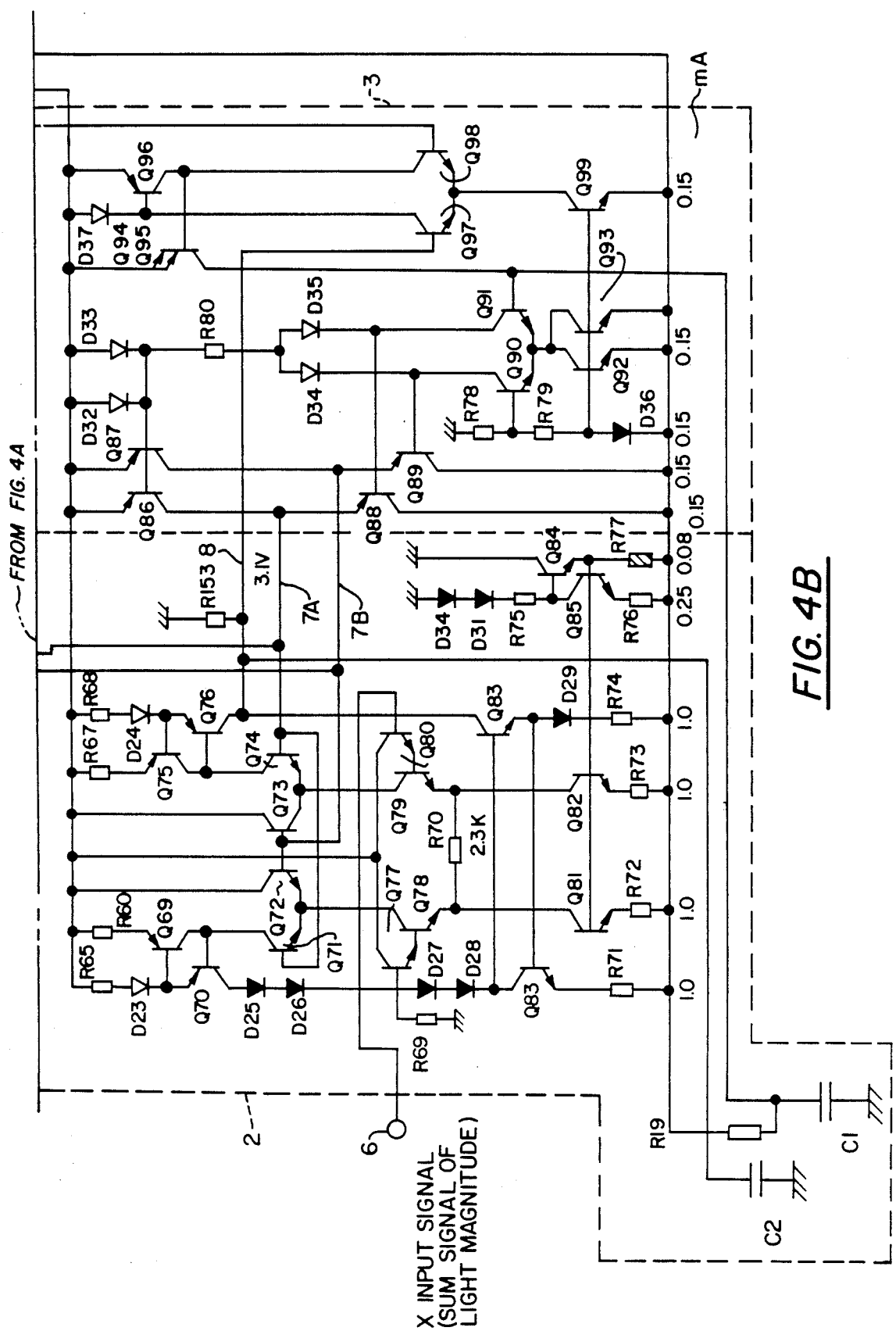

An embodiment of the division circuit of FIG. 3 is shown in FIG. 4. In FIG. 4, transistors $Q_9$, $Q_{10}$, $Q_{11}$, and $Q_{12}$ and resistor $R_6$ and $R_7$ constitute an input differential amplifier of a darlington connection. Transistors $Q_{15}$ and $Q_{16}$, resistor $Q_9$ and $Q_{10}$, transistor $Q_{18}$ and $Q_{17}$, resistors $R_{12}$, $R_{13}$ and $R_{14}$ and diodes $D_8$ and $D_9$ constitute a current source. Transistors $Q_3$, $Q_4$, $Q_5$ and $Q_6$ constitute a gain-control stage. When a base electric potential of the transistors $Q_3$ and $Q_6$ are made higher than a base electric potential of the transistors $Q_4$ and $Q_5$, the amount of the z input signal transmitted to a current mirror load increases, and the gain increases. Gain control can be made by controls of the base electric potential of the transistors $Q_3$ and $Q_6$ and the base electric potential of the transistors $Q_4$ and $Q_5$. Hereupon, the transistors $Q_1$ and $Q_2$, a diode $D_1$ and the resistors $R_1$ and $R_2$ constitute a current mirror load for the transistor $Q_3$.

Furthermore, transistors $Q_7$ and $Q_8$, a diode $D_6$, and resistors $R_3$ and $R_4$ constitute a current mirror load for the transistor $Q_6$. The collector current which flows in the transistor $Q_{10}$ is distributed to the transistors $Q_3$ and $Q_4$. The collector current of the transistor $Q_3$ is transmitted in the same current value to the transistors $Q_1$ and $Q_2$, the diode $D_1$, the transistors $Q_{13}$ and $Q_{14}$ and the diode $D_7$ and acts to lower the division output signal. The collector current which flows in the transistor $Q_{11}$ is distributed to the transistors $Q_5$ and $Q_6$. The collector current of the transistor $Q_6$ is transmitted in the same current value to the transistors $Q_7$ and $Q_8$ and the diode $D_6$ and acts to raise the division output signal. The diodes $D_2$, $D_3$, $D_4$ and $D_5$ are diodes for level shifting to make Early's effect of the transistor $Q_2$ agree with that of the transistor $Q_8$. The above-mentioned circuit constitutes the gain control amplifier 1.

Transistors $Q_{69}$–$Q_{85}$, diodes $D_{23}$–$D_{31}$ and resistors $Q_{65}$–$Q_{77}$ and $R_{153}$ constitute the gain control amplifier 2 included in the AGC circuit.

Further, transistors $Q_{86}$–$Q_{99}$, diodes $D_{32}$–$D_{37}$ and resistors $Q_{78}$–$Q_{80}$ constitute the AGC detecting circuit 3. An AGC output signal 8 of the gain control amplifier 2 included in the AGC circuit is compared with the reference input signal 9 in transistors $Q_{97}$ and $Q_{98}$ making up a differential amplifier having an active load. The output signal of the transistors $Q_{97}$ and $Q_{98}$ supplied to a smoothing filter $C_1$ and $R_{19}$ by the transistors $Q_{94}$ and $Q_{95}$, and renders the gain control signal by transistors $Q_{90}$ and $Q_{91}$ making up a differential amplifier and having the diodes $D_{34}$ and $D_{35}$ as loads.

In the above mentioned circuit, it is provided in the x input signal is a negative signal, and when it increases in negative side, the signal level is high. When the AGC output signal 8 is higher than the reference input signal 9 in negative side, the transistor $Q_{97}$ turns off, and the transistor $Q_{98}$ turns on. Furthermore, since the diode $D_{37}$ and the transistor $Q_{96}$ turn off, and the transistors $Q_{94}$ and $Q_{95}$ turn on, the capacitor $C_1$ is charged and an electric potential of the base of the transistor $Q_{91}$ rises. Hence, a collector current of the transistor $Q_{91}$ increases more than a collector current of the transistor $Q_{90}$, and an electric potential of the cathode of the diode $D_{35}$ and an electric potential of the emitter of the transistor $Q_{88}$ both become lower. Further, an electric potential of the base of the transistors $Q_{74}$ and $Q_{71}$ decrease, and a gain of the gain control amplifier 2 decreases, and negative AGC output signal 8 is equalized to the reference input signal 9. When the AGC output signal 8 is negative and is lower than the reference input signal 9, a reverse operation is accomplished. Gain control signals 7a and 7b, which are output from the emitters of the transistors $Q_{88}$ and $Q_{89}$, are supplied to the based of the transistors $Q_3$–$Q_6$ that constitute the gain control amplifier 1, and are controlled to the same gain of the gain control amplifier 2. In this circuit, a polarity turns over upon the transmission of a signal from the z input signal to the division output signal 5. Furthermore, the operation range of the division circuit is $$(x \text{ input signal}) \cdot (\text{maximum gain}) \geqq (\text{reference input signal}) \quad (10)$$

$$(\text{maximum gain}) = \frac{R_{153}}{R_{70}} \times 2, \quad (11)$$

and the x input signal and the z input signal are required to be within a dynamic range of the gain control amplifiers 1 and 2.

FIG. 5 is a main circuit wherein the above mentioned division circuit is applied to the optical recording and reproducing apparatus. Numerals 16 designates an operational amplifier that inputs a focus error signal, and number 17 designates an operational amplifier that inputs the sum signal of light magnitude. Numeral 19 designates a phase compensation circuit.

In the circuit shown in FIG. 4, when gain of the gain control amplifiers 1 and 2 are varied from minimum to maximum by variation of the gain control signal, various offset voltages are added to the division output signal, and a stable focus servo is disturbed.

Figure 6:
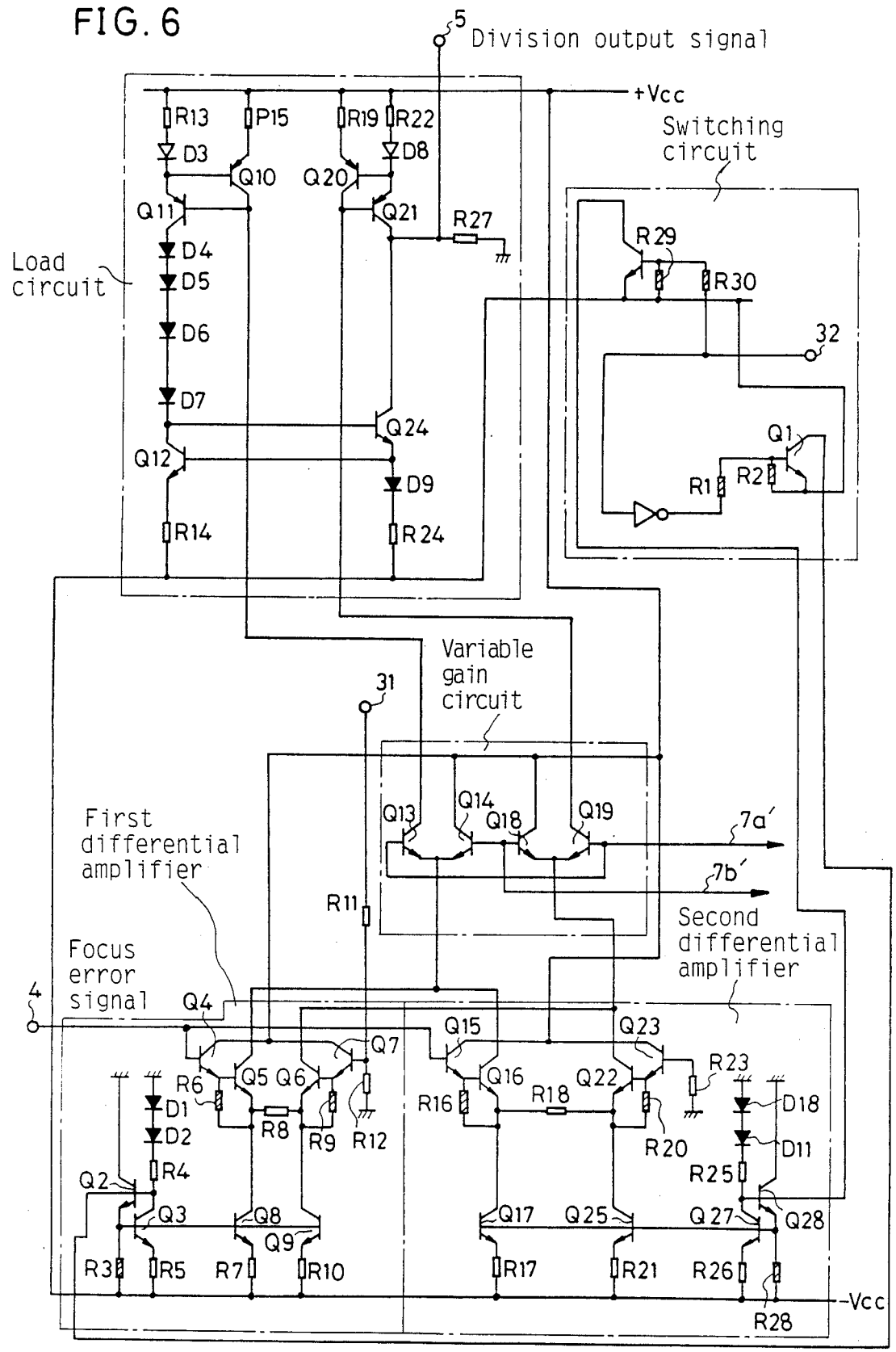
FIG. 6 is a circuit diagram showing the main components of another embodiment.
Figure 6A:
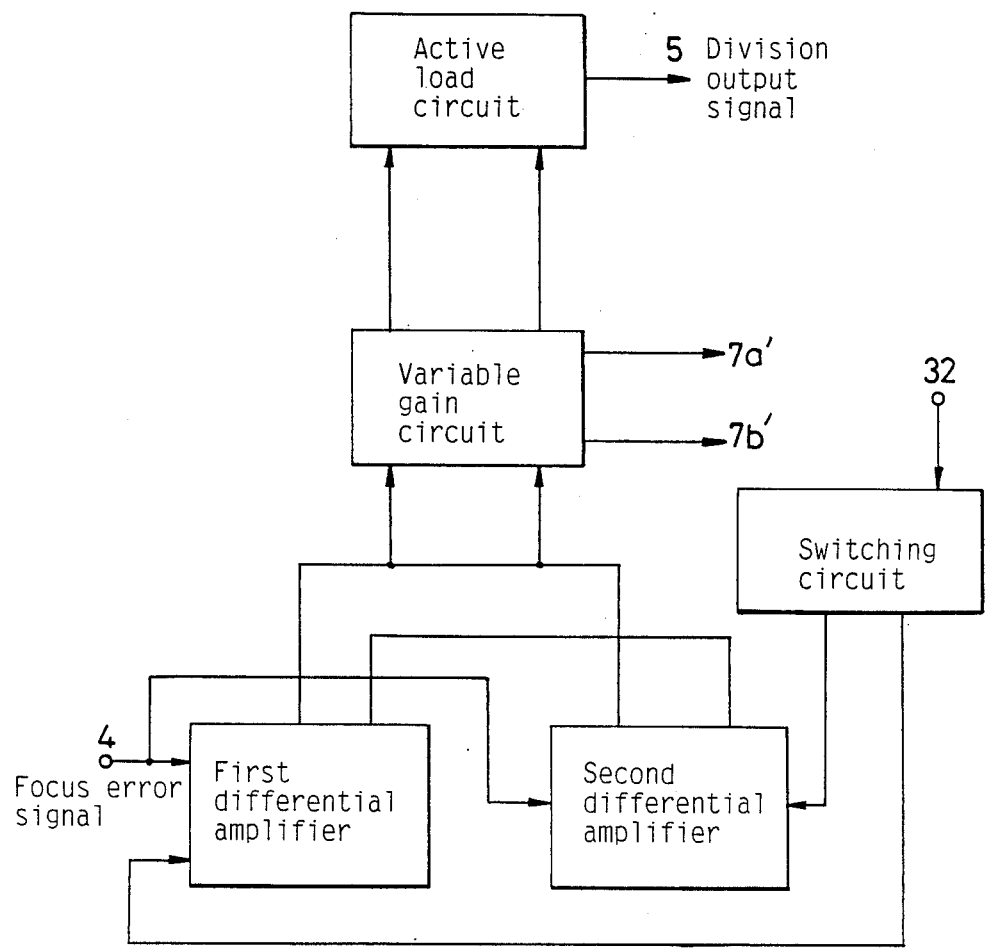
FIG. 6A is a block diagram of FIG. 6.
Figure 7A:
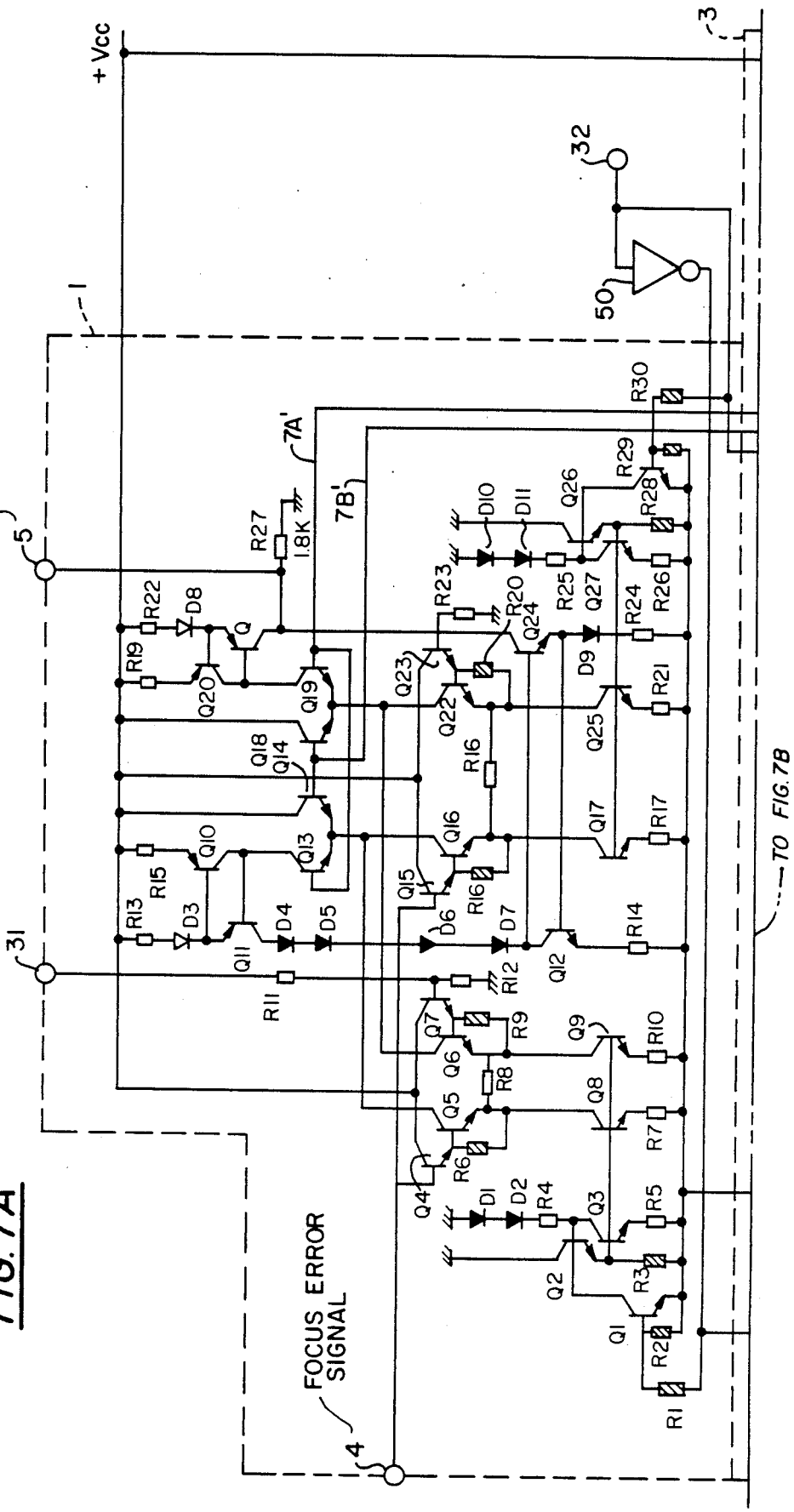
FIGS. 7(A, B) is a circuit showing the whole division circuit of FIG. 6.
Figure 7B:
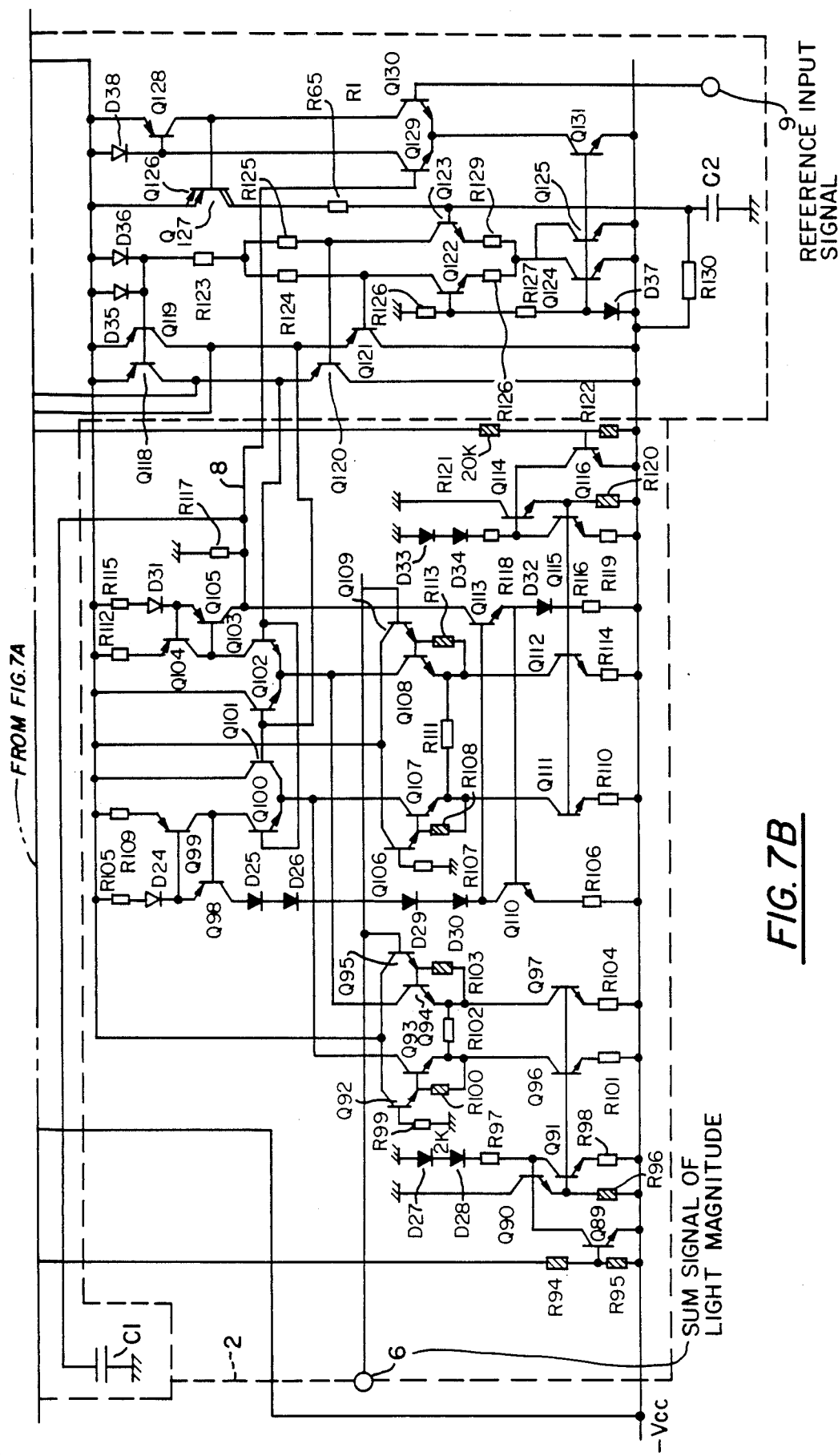

A circuit for solving the problem is shown in FIG. 6. A main part of the division circuit is shown in FIG. 5, and the whole configuration of the division circuit is shown in FIG. 7. In FIG. 6, parts which are different from FIG. 4 are shown. An input differential amplifier of a darlington connection comprised of the transistors $Q_4$, $Q_5$, $Q_6$ and $Q_7$ and resistors $R_6$, $R_8$, $R_9$ and $R_{12}$ is provided. A current source comprised of the transistors $Q_2$ and $Q_3$, the resistors $R_3$, $R_4$ and $R_5$, the diodes $D_1$ and $D_2$, the transistors $Q_8$ and $Q_9$ and the resistors $R_7$ and $R_{10}$ is provided. Switching transistors $Q_1$ and $Q_{28}$ for switching on and off the current course and a current source which is constituted by the transistors $Q_{17}$, $Q_{25}$, $Q_{26}$ and $Q_{27}$ as main components is also provided. Hence, the focus error signal is supplied to the base of the transistor $Q_4$ which constitutes the above mentioned input differential amplifier. Furthermore, the above-mentioned switching transistors $Q_1$ and $Q_{28}$ are controlled on or off by a switching signal applied to a terminal 32. Incidentally, the supplying to the transistor $Q_1$ is made by inverting the polarity of the switching signal 32 by an invertor 50.

Other components are identical with the configuration shown in FIG. 4, through the reference numerals are different.

When offset voltages appearing in the division output signal are considered, they are the following five kinds:

(1) An offset voltage included in the focus error signal, (2) an offset voltage due to deviation of $V_{BE}$ (voltage across the base and the emitter) of transistors $Q_{15}$, $Q_{16}$, $Q_{22}$ and $Q_{23}$ constituting the input differential amplifier, (3) an offset voltage due to deviation of $V_{BE}$ of the transistors $Q_{13}$, $Q_{19}$, $Q_{14}$ and $Q_{18}$, (4) an offset voltage caused by the fact that the miller coefficients of the three miller current circuits are not 1,
(5) an offset voltage due to deviation of $V_{BE}$ of the current source transistors $Q_{17}$ and $Q_{25}$ and resistance of the resistors $R_{17}$ and $R_{21}$.

Among these, those of items (1), (2), (4) and (5) are constant offset voltages, and these can be removed by adjusting the offset voltage of (5) to zero when the gain of the gain control amplifier 1 is maximum.

However, the offset voltage of (3) varies depending on the state of the gain control and can not be removed as far as $V_{BE}$ in the transistors $Q_{13}$, $Q_{14}$, $Q_{18}$ and $Q_{19}$ has the deviations.

In order to reduce this offset voltage, two methods of reducing current of the current source due to the resistors $R_{17}$ and $R_{21}$ and decreasing resistance of an output load resistor $R_{27}$ are considered.

On the other hand, a dynamic range of the input differential amplifier is determined by an emitter resistor $R_{18}$ and a current of the current source ($I_O$). Furthermore, the maximum gain of the gain control amplifier is determined by:

$$\text{(maximum gain of the gain control amplifier)} = \frac{R_{27}}{R_{18}} \times 2.$$

Focus error signals and the light magnitude sum signals during the recording process and the reproducing process have a difference of about a factor of 4. Therefore, in order to obtain the same output signal at the division output terminal, the dynamic range and the maximum gain of the input differential amplifier for recording may be to be four times (for dynamic range) and one fourth (for maximum gain) of the input differential amplifier for reproducing, respectively. Hence, in the circuit of FIG. 6, the value of emitter resistor $R_8$ of one input differential amplifier is made $R_8 = 2$ KΩ (for recording), the value of the emitter resistor $R_{18}$ of another input differential amplifier is made $R_{18} = 400\Omega$ (for reproducing), and one of these two input differential amplifiers are switched on depending on whether a recording process or a reproducing process is taking place. Hence, a current of the current source can be reduced to half, the output load resistance to one third, the offset voltage of the division output signal to one fifth or one sixth.

Switching operation between the above mentioned dual input differential amplifiers is accomplished by turning ON or OFF of the current source. When the switching signal applied to the terminal 32 is of a high level, the transistor $Q_{28}$ turns ON, and the operation of the current source, which is constituted by the transistors $Q_{26}$ and $Q_{27}$, the diodes $D_{10}$ and $D_{11}$ and the resistors $Q_{25}$, $Q_{26}$, and $Q_{28}$, is stopped. Consequently, the transistors $Q_{17}$ and $Q_{25}$ turn OFF. The input differential amplifier comprised of transistors $Q_{15}$, $Q_{16}$, $Q_{22}$, and $Q_{23}$ is not operated. On the contrary, since the transistor $Q_1$ is OFF, the current source, comprised of diodes $D_1$ and $D_2$, the transistor $Q_2$ and $Q_3$ and the resistors $R_3$, $R_4$ and $R_5$, is operated, and the input differential amplifier, comprised of transistors $Q_4$-$Q_7$, is operated.

An offset adjusting terminal 31 is for absorbing a difference of the offsets of the dual input differential amplifiers and a dispersion of the respective current sources thereof.

FIG. 7 is of a whole configuration of the division circuit including the configuration as shown in FIG. 6.

The gain control amplifier 2 in the AGC circuit has the identical configuration as the circuit as shown in FIG. 4. Omission of the offset adjusting terminal 31 in this gain control amplifier 2 is made because the influence that the offset voltage, included in the sum signal of the light magnitude, gives to the division output signal, is of a division error, and the requirements for the division error are satisfied with the circuit as shown in FIG. 6.

Figure 8:
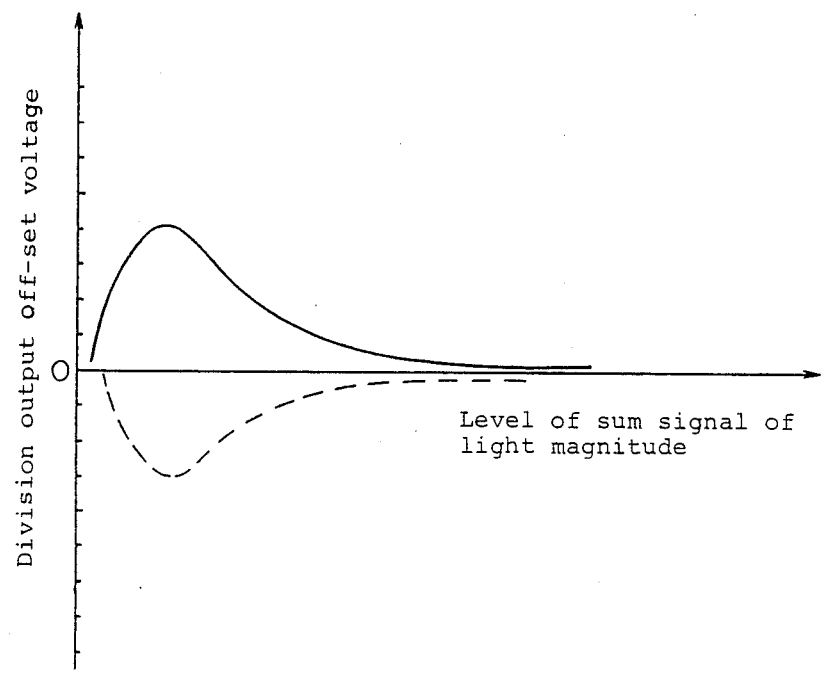
FIGS. 8a and b are characteristic charts showing the offset voltage effects of the embodiments of the present invention.
Figure 8:
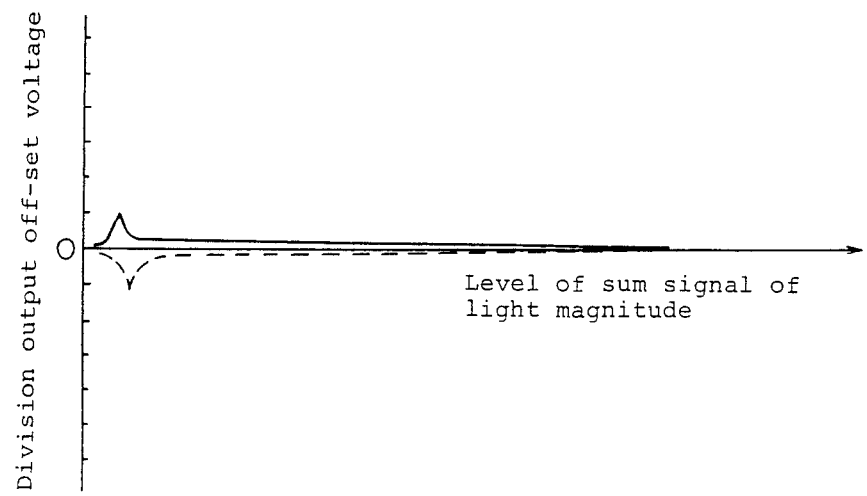

A comparison of levels of offset voltages included in the division output signals in both cases of the configuration of FIG. 4 and of the configuration of FIG. 6 is shown in FIGS. 8a and b. In FIG. 8, respective abscissas show levels of the light magnitude of sum signal, respective ordinates show levels of the offset voltages. FIG. 8a shows characteristics in the case of the configuration shown in FIG. 4. FIG. 8b shows characteristics in the case of the configuration shown in FIG. 6. As is obvious from comparison of both characteristics, the offset voltage included in the division output signal can be extremely reduced according to the configuration as shown in FIG. 6.

Thus, according to the configuration of FIG. 6, the offset voltage issued in the division output of the feedback system in the optical recording and reproducing apparatus can be extremely reduced by the addition of a few circuits and the addition of an offset adjustment in one position. A stable feed back system of the focus servo circuit is therefore realized.

Though elucidation is made by taking the focus servo circuit as an example in the above-mentioned embodiment, this configuration is also applicable to the tracking servo circuit. In this case, the configuration is quite similar to the case of FIG. 1, and only the point at which the actuator controls the laser, that being in the radial direction of the disk, is different.

According to the present invention, a division circuit suitable for an IC and having a few offset adjustments is obtainable. Furthermore, by using those which have different dynamic ranges and maximum gains as input differential amplifiers constituting gain control amplifiers, and by switching dual input differential amplifiers for recording or for reproducing, the offset voltage included in the division output signal can be greatly reduced, and a stable focus servo circuit and tracking servo circuit can be made in an optical reproducing apparatus or an optical recording and reproducing apparatus.

While the invention has been described in connection with what is presently considered to be the most practical and preferred embodiment, it is to be understood that the invention is not limited to the disclosed embodiment but, on the contrary is intended to cover various modification and equivalent arrangements included within the spirit and scope of the appended claims.

We claim:

1. An apparatus for optical recording and reproducing on an optical disk comprising:
   an optical system for impinging a laser light recording beam onto said optical disk to record information on said optical disk and impinging a laser light reproducing beam on said optical disk to reproduce information from said optical disk, said laser light recording beam having a higher power than said laser light reproducing beam;
   a photoelectric device for generating electric signals in response to light from said laser light recording beam and said laser light reproducing beam from a surface of said optical disk;

a first circuit means for producing a first signal representing whole light magnitude information of said reflected light in response to said electric signals from said photoelectric device;

a second circuit means for producing a second signal representing servo error information of said laser light recording beam and said laser light reproducing beam on said optical disk in response to said electric signal from said photoelectric device;

a division circuit comprising:
an automatic gain control circuit having a signal input that inputs said first signal and a reference input for producing a gain control voltage,
a gain control amplifier having a gain control input and a signal input that inputs said second signal for producing at an output terminal a division output signal,
means for coupling said automatic gain control circuit and said gain control amplifier so that said gain control voltage is input to said gain control input of said gain control amplifier, and
switching means for changing a dynamic range and a maximum gain of said gain control amplifier in accordance with a change between using said laser light recording beam and said laser light reproducing beam by said optical system;

a phase compensation circuit having an input that inputs said division output signal for compensating a phase of said division output signal; and a driving circuit for driving said optical system in response to said compensated division output signal to control servo operation of said optical system.

2. A control circuit in accordance with claim 1, wherein:
said servo error information represents one of a tracking error between said laser light and said optical disk and a focusing error of said laser light on said optical disk.

3. A control circuit in accordance with claim 1, wherein
said gain control amplifier comprises first and second differential amplifiers for amplifying the second signal, said first differential amplifier and said second differential amplifier having different dynamic ranges and maximum gains, and one of said first and second differential amplifiers is selectively made operable by said switching means.

4. A control circuit in accordance with claim 3, wherein said servo error information represents one of a tracking error between said laser light and said optical disk and a focusing error of said laser light on said optical disk.

5. A control circuit in accordance with claim 3, wherein said first differential amplifier contains transistors having emitters commonly connected and a first emitter resistor of 2000 ohms connected to said commonly connected emitters, and
said second differential amplifier contains transistors having emitters commonly connected and a second emitter resistor of 400 ohms connected to said commonly connected emitters.

* * * * *